(12) United States Patent
Kirchner et al.

(10) Patent No.: US 9,929,650 B1
(45) Date of Patent: Mar. 27, 2018

(54) IMPLEMENTATION OF SPREAD SPECTRUM IN PFM MODE FOR DC-DC CONVERTERS

(71) Applicant: Texas Instruments Deutschland GmbH, Freising (DE)

(72) Inventors: Joerg Kirchner, Mauern (DE); Hermann Seibold, Haag (DE); Ivo Huber, Roehrmoos (DE)

(73) Assignee: Texas Instruments Deutschland GmbH, Freising (DE)

( * ) Notice: Subject to any disclaimer, the term of this patent is extended or adjusted under 35 U.S.C. 154(b) by 0 days.

(21) Appl. No.: 15/274,024

(22) Filed: Sep. 23, 2016

(51) Int. Cl.
*H02M 3/157* (2006.01)
*H02M 3/158* (2006.01)
*H02M 1/08* (2006.01)
*H02M 1/14* (2006.01)
*H02M 1/00* (2006.01)

(52) U.S. Cl.
CPC ............ *H02M 3/158* (2013.01); *H02M 1/08* (2013.01); *H02M 1/14* (2013.01); *H02M 2001/0009* (2013.01)

(58) Field of Classification Search
CPC ............ H02M 3/1584; H02M 3/1586; H02M 2003/1566; H02M 3/156; H02M 3/157; H02M 3/158; H02M 3/1588
See application file for complete search history.

(56) References Cited

U.S. PATENT DOCUMENTS 8,541,995 B2 * 9/2013 Tang .................. H02M 3/1584
323/272

* cited by examiner

*Primary Examiner* — Gary L Laxton
(74) *Attorney, Agent, or Firm* — William B. Kempler; Charles A. Brill; Frank D. Cimino

(57) ABSTRACT

Methods and apparatus for operating a DC-to-DC voltage converter that has a power stage that includes at least one switching transistor. The output voltage of the DC-to-DC voltage converter is monitored. If the output voltage drops below a lower output voltage threshold, a series of drive pulses is provided to the at least one switching transistor to commence switching of the at least one switching transistor. If the output voltage rises above an upper output voltage threshold, a random number of additional drive pulses is provided to the at least one switching transistor and then the provision of drive pulses to the at least one switching transistor is ceased.

18 Claims, 3 Drawing Sheets

IMPLEMENTATION OF SPREAD SPECTRUM IN PFM MODE FOR DC-DC CONVERTERS

BACKGROUND

The increasing demand of integrating electronic devices onto automotive, industrial, and consumer platforms requires more sophisticated power conversion and distribution designs. Often these electronic devices include embedded processors, memories, and other electronic components that are operated from one battery source. DC-to-DC voltage converters are used to supply different voltages to the different electronic components.

Switching DC-to-DC voltage converters are popular because of their high efficiency over a wide voltage input range. In contemporary low-power switching DC-to-DC converters, voltage regulation is achieved by pulse-width modulation (PWM). In pulse-width modulation, a control circuit produces a rectangular pulse wave that drives an internal transistor (or transistors in a synchronous device), rapidly switching the transistor(s) at a set frequency, typically in the range of a few megahertz. The output voltage of such a DC-to-DC voltage converter is proportional to the duty cycle of the drive pulse. A voltage-feedback or current-feedback control loop allows a PWM controller output to regulate the output voltage in response to load changes. The technique generally works well, but at low loads the efficiency falls off rapidly, which can shorten battery life in portable products, particularly those that spend a lot of time in a "standby" mode.

One technique for improving the efficiency of a DC-to-DC converter at low loads is to introduce a pulse-frequency modulation (PFM) mode at low loads. PFM control is similar to PWM control in that it employs a rectangular pulse train to determine the output voltage of the regulator. However, instead of altering the duty cycle of the pulse train of a fixed frequency to set the output voltage, PFM alters the frequency of a pulse train having a fixed duty cycle.

FIG. 1 is a schematic circuit diagram representing an illustrative DC-to-DC voltage converter 100. The type of DC-to-DC voltage converter 100 depicted in FIG. 1 is sometimes referred to as a buck converter. The DC-to-DC voltage converter 100 includes a power stage 110 that includes a high-side transistor Q1 and a low-side transistor Q2 that serve as switches. In the example of FIG. 1, transistor Q1 is a p-channel transistor and transistor Q2 is an n-channel transistor. The source of transistor Q1 is coupled to a voltage input 102 that is couplable to a power supply. During operation of the DC-to-DC voltage converter 100, the voltage input 102 operates at an input voltage $V_{in}$, which is a DC voltage that is to be converted to another DC voltage by the DC-to-DC voltage converter 100. The drain of transistor Q1 is coupled to a switch node N1. The drain of transistor Q2 is coupled to the switch node N1 and the source of transistor Q2 is coupled to a ground node. The ground node may operate at a potential of ground or a potential that is different than or lower than the input voltage $V_{in}$. In the illustrative embodiment shown in FIG. 1, the high-side transistor Q1 is a PMOS (p-channel metal-oxide-semiconductor field-effect) transistor and the low-side transistor Q2 is an NMOS (n-channel metal-oxide-semiconductor field-effect) transistor, which constitutes a typical power stage for a DC-to-DC voltage converter.

The DC-to-DC voltage converter 100 further includes an output stage 120 that includes an inductor 112, an output capacitor 114, and an output node 116 that is couplable to a load. A first terminal of inductor 112 is coupled to the switch node N1. The second terminal of the inductor 112 is coupled to the output capacitor 114. The output 116, or output node, of the DC-to-DC voltage converter 100 operates at an output voltage $V_{out}$ and is coupled to the junction of the inductor 112 and the output capacitor 114. The output voltage $V_{out}$ is the DC voltage generated by the DC-to-DC voltage converter 100.

The gates of transistors Q1 and Q2 are coupled to a control circuit 130 that generates gate voltages to turn the transistors Q1 and Q2 off and on. Accordingly, the control circuit 130 serves as a switch controller to control the switching function of transistors Q1 and Q2. The DC-to-DC voltage converter 100 receives the input voltage $V_{in}$ at the input 102. At times when the control circuit 130 is causing the transistors Q1 and Q2 to switch, the control circuit turns transistors Q1 and Q2 on and off such that one transistor is on while the other transistor is off. The on and off periods control the current $I_L$ flowing through the inductor 112. The current $I_L$ generates a voltage across the output capacitor 114, which is the output voltage $V_{OUT}$ of the DC-to-DC voltage converter 100. As mentioned previously, the DC-to-DC converter 100 shown in FIG. 1 is merely illustrative. The illustrative converter 100 of FIG. 1 employs a synchronous power stage 110 with two synchronous transistors Q1 and Q2. Alternative embodiments can employ a single power stage transistor that drives the output stage 120.

In the pulse-frequency modulation (PFM) operating mode, the switching activity of the transistors Q1 and Q2 is reduced. FIG. 2 is a timing diagram showing the relationship of gate driver signals 200 provided to transistor Q1, the inductor current $I_L$ 210 and the output voltage $V_{out}$ 220. Note that the gate driver signal provided to transistor Q2 is not shown in FIG. 2, but when transistors Q1 and Q2 are in a switching mode, the gate driver signals for transistors Q1 and Q2 are complementary, such that transistor Q2 is off when transistor Q1 is on and vice versa. As can be seen in FIG. 2, a low value of the rectangular pulse 200 provided to the gate of PMOS transistor Q1 causes the transistor Q1 to turn on, which in turn causes the inductor current $I_L$ 210 to rise until the gate driver signal 200 goes high, thus turning transistor Q1 200 off. When the transistor Q1 switches off, the inductor current $I_L$ 210 drops until the transistor Q1 200 switches back on again, and so forth. The control circuit 130 of FIG. 1 monitors the output voltage $V_{out}$. When the output voltage $V_{out}$ 220 surpasses an upper voltage threshold $V_{th2}$, the control circuit 130 causes the transistor Q1 to stop switching, that is, the control circuit 130 turns off transistor Q1 by providing a high gate driver signal to the gate of transistor Q1. Thus, the output capacitor 114 of the voltage converter 100 is charged with one or several pulses. In the example represented by FIG. 2, the output capacitor 114 is charged with four pulses before the output voltage $V_{out}$ 220 reaches the upper threshold voltage $V_{th2}$. Then the switching activity is stopped by the control circuit 130 and the supply current of the voltage converter 100 is reduced to a minimum. The output capacitor 114 is then discharged by the load current, causing the output voltage $V_{out}$ 220 to drop. When the output voltage drops below a lower threshold voltage $V_{th1}$ the voltage converter 100 is enabled again, i.e., the control circuit 130 causes the transistors Q1 and Q2 to begin switching again, and the output capacitor 114 is charged again.

Depending on the load current, output capacitor 114 and several other parameters, a DC-to-DC voltage converter operating in a pulse-frequency modulation mode such as represented in FIG. 2 generates pulse frequencies much lower than the switching frequency, down to the audio frequency band. As can be seen in FIG. 2, under constant conditions these frequencies are also constant. These low constant frequencies can result in a significant spur energy being generated at the single frequency of PFM operation, which can disturb other sensitive circuits in the system.

SUMMARY

Illustrative aspects of the present disclosure are directed to a method of operating an electrical circuit that comprises at least one switching transistor. Pursuant to said method, drive pulses are provided to the at least one switching transistor to cause switching of the at least one switching transistor. A parameter of the electrical circuit is monitored and compared to a threshold value. If the parameter reaches the threshold value, a random number of additional drive pulses is provided to the at least one switching transistor and then the providing of drive pulses to the at least one switching transistor is ceased.

Other illustrative aspects of the present disclosure are directed to a DC-to-DC voltage converter that has a power stage and an output stage. The power stage includes a voltage input, a switching transistor, and a control circuit. The switching transistor has first, second and third terminals, wherein a voltage level at the first terminal controls in part a current flow from the second terminal to the third terminal. The second terminal is coupled to the voltage input. The control circuit provides switching control signals to the first terminal of the switching transistor. The output stage includes an inductor and an output capacitor. The inductor is coupled between the third terminal of the switching transistor and a voltage output. The output capacitor is coupled between the voltage output and ground. The control circuit monitors the output voltage at the voltage output. In response to the output voltage dropping below a lower output voltage threshold, the control circuit begins providing a series of drive pulses to the first terminal of the switching transistor. In response to the output voltage rising above an upper output voltage threshold, the control circuit provides a random number of additional drive pulses to the first terminal of the switching transistor and then stops providing drive pulses to the first terminal of the switching transistor.

Other illustrative aspects of the present disclosure are directed to a DC-to-DC voltage converter that has a switching transistor, an inductor, and a control circuit. The switching transistor has first, second and third terminals. A voltage level at the first terminal controls in part a current flow from the second terminal to the third terminal. The inductor is coupled between the third terminal of the switching transistor and a voltage output. The control circuit monitors the output voltage at the voltage output and commences providing a series of drive pulses to the first terminal of the switching transistor in response to the output voltage dropping below a lower output voltage threshold. In response to the output voltage rising above an upper output voltage threshold, the control circuit provides a random number of additional drive pulses to the first terminal of the switching transistor and then ceases providing drive pulses to the first terminal of the switching transistor.

DETAILED DESCRIPTION

Illustrative aspects of the present disclosure are directed to techniques for reducing the spur energy generated by a DC-to-DC converter operating in pulse-frequency modulation (PFM) mode converters. Aspects of the present disclosure are applicable to substantially any type of DC-to-DC voltage converter that employs a pulse-frequency modulation (PFM) mode.

Figure 1:
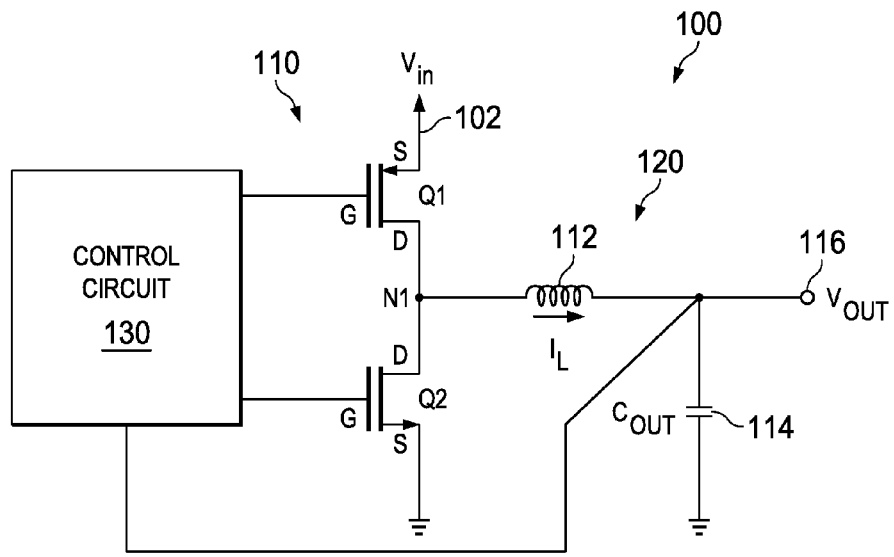
FIG. 1 is a schematic circuit diagram representing an illustrative DC-to-DC voltage converter.
Figure 3:
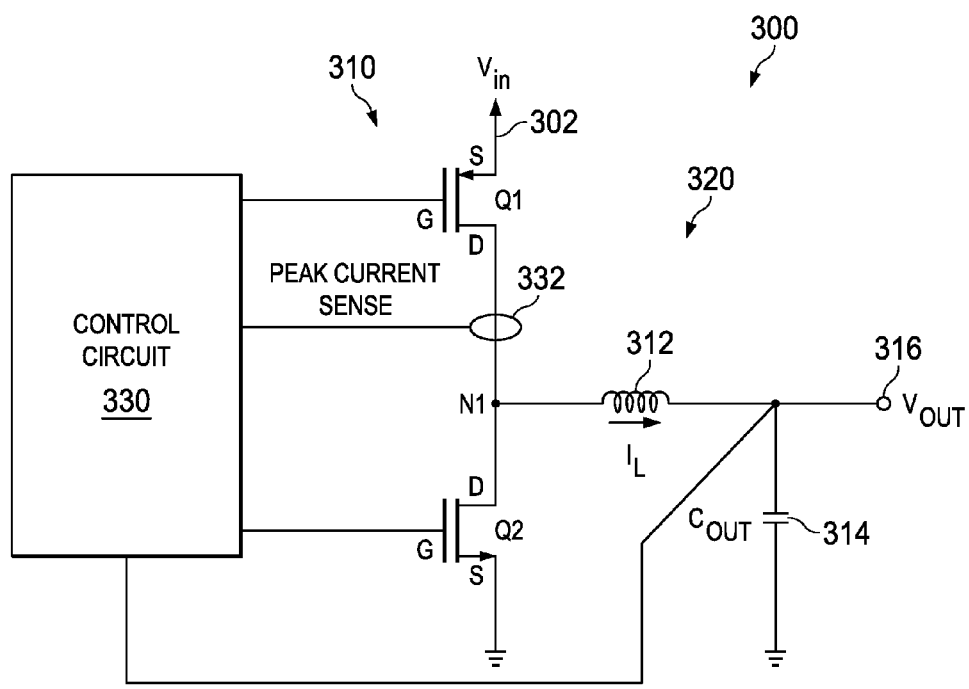
FIG. 3 is a schematic circuit diagram representing an illustrative DC-to-DC voltage converter.
Figure 2:
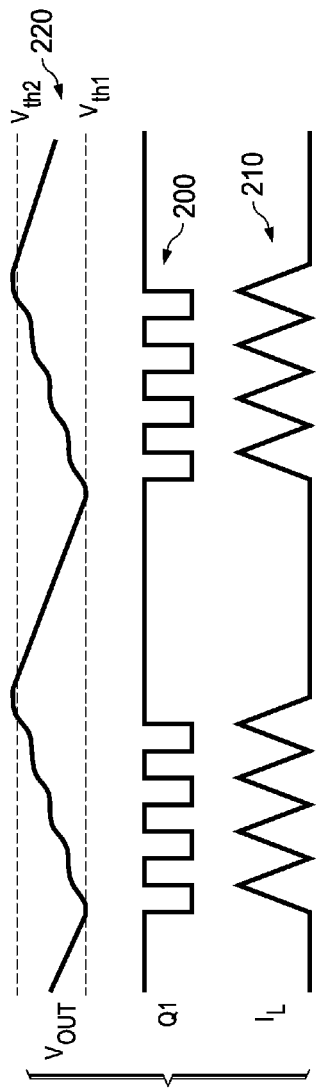
FIG. 2 is a timing diagram showing the relationship of gate driver signals provided to a switching transistor, an inductor current, and an output voltage of a DC-to-DC converter operating in PFM mode.

FIG. 3 is a schematic circuit diagram representing an illustrative DC-to-DC voltage converter 300. The type of DC-to-DC voltage converter 300 depicted in FIG. 3 is sometimes referred to as a buck converter. For purposes of illustration, aspects of the disclosure will be described with respect to a buck converter topology such as that shown in FIG. 3, but aspects of the present disclosure are applicable to other converter topologies as well. The DC-to-DC voltage converter 300 includes a power stage 310 that includes a high-side transistor Q1 and a low-side transistor Q2 that serve as switches. In the example of FIG. 3, transistor Q1 is a p-channel transistor and transistor Q2 is an n-channel transistor. The source of transistor Q1 is coupled to a voltage input 302 that is couplable to a power supply. During operation of the DC-to-DC voltage converter 300, the voltage input 302 operates at an input voltage $V_{in}$, which is a DC voltage that is to be converted to another DC voltage by the DC-to-DC voltage converter 300. The drain of transistor Q1 is coupled to a switch node N1. The drain of transistor Q2 is coupled to the switch node N1 and the source of transistor Q2 is coupled to a ground node. The ground node may operate at a potential of ground or a potential that is different than or lower than the input voltage $V_{in}$. In the illustrative embodiment shown in FIG. 3, the high-side transistor Q1 is a PMOS (p-channel metal-oxide-semiconductor field-effect) transistor and the low-side transistor Q2 is an NMOS (n-channel metal-oxide-semiconductor field-effect) transistor, which constitutes a typical power stage for a DC-to-DC voltage converter.

The DC-to-DC voltage converter 300 further includes an output stage 320 that includes an inductor 312, an output capacitor 314, and an output node 316 that is couplable to a load. A first terminal of inductor 312 is coupled to the switch node N1. The second terminal of the inductor 312 is coupled to the output capacitor 314. The output 316, or output node, of the DC-to-DC voltage converter 300 operates at an output voltage $V_{out}$ and is coupled to the junction of the inductor 312 and the output capacitor 314. The output voltage $V_{out}$ is the DC voltage generated by the DC-to-DC voltage converter 300.

The gates of transistors Q1 and Q2 are coupled to a control circuit 330 that generates gate voltages to turn the transistors Q1 and Q2 off and on. Accordingly, the control circuit 330 serves as a switch controller to control the switching function of transistors Q1 and Q2. The DC-to-DC voltage converter 300 receives the input voltage $V_{in}$ at the input 302. At times when the control circuit 130 is causing the transistors Q1 and Q2 to switch, the control circuit turns transistors Q1 and Q2 on and off such that one transistor is on while the other transistor is off. The on and off periods control the current $I_L$ flowing through the inductor 312. The current $I_L$ generates a voltage across the output capacitor 314, which is the output voltage $V_{OUT}$ of the DC-to-DC voltage converter 300. A peak current sensor 332 coupled to the drain of the high-side transistor Q1 determines the peak value (and on-time) of the current provided to the inductor 312 and provides this information to the control circuit 330. As mentioned previously, the DC-to-DC converter 300 shown in FIG. 3 is merely illustrative. The illustrative converter 300 of FIG. 3 employs a synchronous power stage 310 with two synchronous transistors Q1 and Q2. Alternative embodiments can employ a single power stage transistor that drives the output stage 320.

Figure 5:
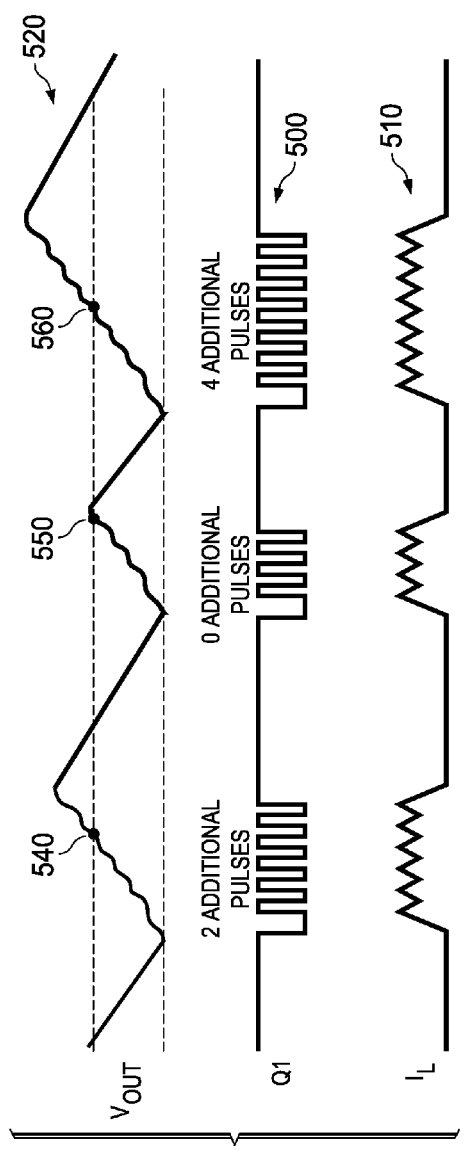
FIG. 5 is a timing diagram showing the relationship of gate driver signals provided to a switching transistor, an inductor current, and an output voltage of a DC-to-DC Converter operating in PFM mode.
Figure 4:
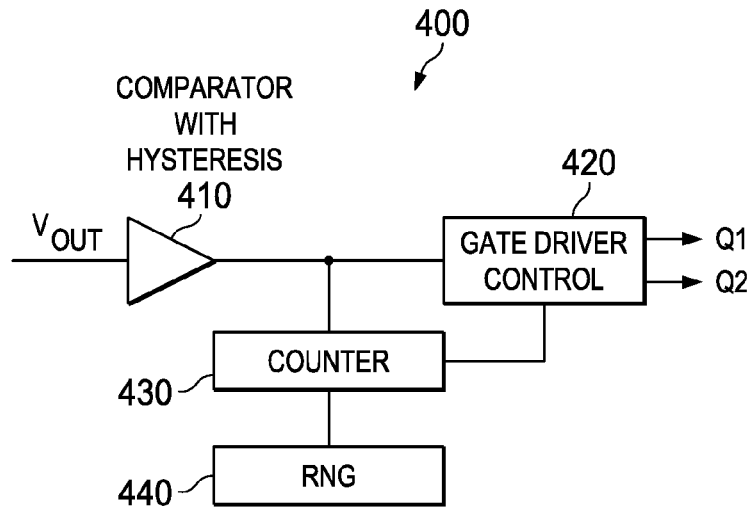
FIG. 4 is a simplified block diagram representing control circuitry pertaining to converter control during PFM operation of a DC-to-DC voltage converter.

FIG. 4 is a simplified block diagram representing control circuitry 400 of control circuit 330 pertaining to converter control during pulse-frequency modulation (PFM) operation of the DC-to-DC voltage converter 300. FIG. 4 shows a comparator 410 with hysteresis, a gate driver circuit 420, a counter 430, and a random number generator (RNG) 440. The operation of the control circuitry 400 will be described with reference to the timing diagram of FIG. 5. FIG. 5 is a timing diagram showing the relationship of gate driver signals 500 provided to transistor Q1 of FIG. 3, the inductor current $I_L$ 510 and the output voltage $V_{out}$ 520 using a PFM-mode control scheme in accordance with aspects of the present disclosure. Note that the gate driver signal provided to transistor Q2 is not shown in FIG. 5, but when transistors Q1 and Q2 are in a switching mode, the gate driver signals for transistors Q1 and Q2 are complementary, such that transistor Q2 is off when transistor Q1 is on and vice versa. As can be seen in FIG. 5, the "low" periods of the rectangular pulses 500 provided to the gate of PMOS transistor Q1 cause the transistor Q1 to turn on, thereby causing the inductor current $I_L$ 510 to rise until the gate driver signal 500 goes high, thereby causing the transistor Q1 to switch off. When the transistor Q1 switches off, it causes the inductor current $I_L$ 510 to drop until the transistor Q1 500 switches back on again, and so forth. In the control scheme represented by FIG. 5, the control circuit 300 drives the switching transistors Q1 and Q2 such that the inductor current $I_L$ 510 has a substantially constant peak value and a substantially constant valley value.

Referring to FIG. 4, the comparator 410 operates with hysteresis. That is, when the output capacitor 314 is discharging, i.e., when the output voltage $V_{out}$ 520 is decreasing, the comparator 410 compares the output voltage $V_{out}$ 520 with a lower threshold voltage $V_{th1}$. And when the output capacitor 314 is charging, i.e., when the output voltage $V_{out}$ 520 is increasing, the comparator 410 compares the output voltage $V_{out}$ 520 to an upper voltage threshold $V_{th2}$. Thus when the output voltage $V_{out}$ 520 drops below the lower voltage threshold $V_{th1}$, the comparator 410 provides a signal (illustratively a logical "0") to the gate driver control circuit 420. In response, the gate driver control circuit 420 commences providing drive pulses 500 to switching transistors Q1 and Q2 to commence switching of the transistors Q1 and Q2, causing a constant-peak or constant-valley current to flow through inductor 312 and charge the output capacitor 314, and causing the output voltage $V_{out}$ 520 to increase.

When the output voltage $V_{out}$ 520 rises above the upper voltage threshold $V_{th2}$, the comparator 410 provides a signal (illustratively a logical "1") to the gate driver control circuit 420 and to the counter 430. In response to the indication that the output voltage $V_{out}$ 520 has risen above the upper threshold voltage $V_{th2}$, rather than immediately stopping its driving of transistors Q1 and Q2 with gate driver pulses 500, the gate drive control circuit 420 continues providing gate driver pulses 500 to the gates of transistors Q1 and Q2, thus increasing the output voltage $V_{out}$ 520 further beyond the upper voltage threshold $V_{th2}$. Meanwhile, when the counter 430 receives the indication from the comparator 410 that the output voltage $V_{out}$ 520 has risen above the upper threshold voltage $V_{th2}$, the counter 430 begins counting the number of gate driver pulses generated by the gate driver circuit 420. When the number of "additional" gate driver pulses, i.e., the number of pulses generated after the output voltage $V_{out}$ rose above the upper voltage threshold $V_{th2}$, reaches a random number produced by the random number generator 440, the counter sends a signal to the gate driver circuit 420 indicating as such. In response to this indication, the gate driver circuit 420 stops driving transistors Q1 and Q2 with gate driver pulses 500, thus reducing the supply current $I_L$ 510 to a minimum, which causes the output capacitor 314 to begin discharging and the output voltage $V_{out}$ 520 to start dropping.

Looking at the example timing diagram of FIG. 5, it can be seen that the first time the output voltage $V_{out}$ 520 rises above the upper voltage threshold $V_{th2}$, at point 540, the random number generator 440 generates the number 2 and therefore the counter 430 counts out two additional gate driver pulses 500 and then causes the gate driver circuit 420 to cease generating gate driver pulses 500. The second time the output voltage $V_{out}$ 520 rises above the upper voltage threshold $V_{th2}$, at point 550, the random number generator 440 generates the number 0. Thus the counter 430 immediately causes the gate driver circuit 420 to cease generating gate driver pulses 500. The third time the output voltage $V_{out}$ 520 rises above the upper voltage threshold $V_{th2}$, at point 560, the random number generator 440 generates the number 4 and therefore the counter 430 counts out four additional gate driver pulses 500 before causing the gate driver circuit 420 to cease generating gate driver pulses 500.

With this solution, the peak and ripple voltage of the PFM operation is modulated randomly. Therefore the PFM frequency is modulated by the number of additional pulses, which causes the spur energy to spread. With increasing load current, the number of switching cycles during the charge phase increases. Therefore the effect of the additional pulses is reduced. This automatically reduces the PFM ripple voltage close to continuous conduction mode and ensures a smooth and stable transition of the two operating conditions.

In an alternative embodiment of the present disclosure, rather than using a counter 430 and a random number generator 440 to randomly vary the peak output voltage and the PFM frequency, the control circuit 330 randomly varies the upper voltage threshold $V_{th2}$ of the comparator 410 in each capacitor charging phase. This achieves the same result as that shown in FIG. 5, i.e., the peak and ripple voltage and the PFM frequency of the PFM operation is randomly modulated, which causes the spur energy to spread.

As explained above, in the illustrative embodiment represented by FIGS. 4 and 5, the counter 430 starts counting out a random number of additional gate driver pulses when the output voltage $V_{out}$ rises above the upper voltage threshold $V_{th2}$, and the control circuit 330 stops providing gate driver pulses after the additional number of pulses has been provided. The control circuit then resumes providing gate driver pulses when the output voltage $V_{out}$ drops below the lower voltage threshold $V_{th1}$. Thus, in this illustrative embodiment the determination of when to start and stop providing the gate driver pulses is based on the output voltage $V_{out}$. In alternative embodiments, the determination of when the counter 430 starts counting out a random number of additional pulses is based on criteria other than the output voltage $V_{out}$. In such alternative embodiments, the counter 430 receives the indication to commence counting out a random number of additional pulses from some circuit element other than a comparator observing the output voltage $V_{out}$.

Figure 6:
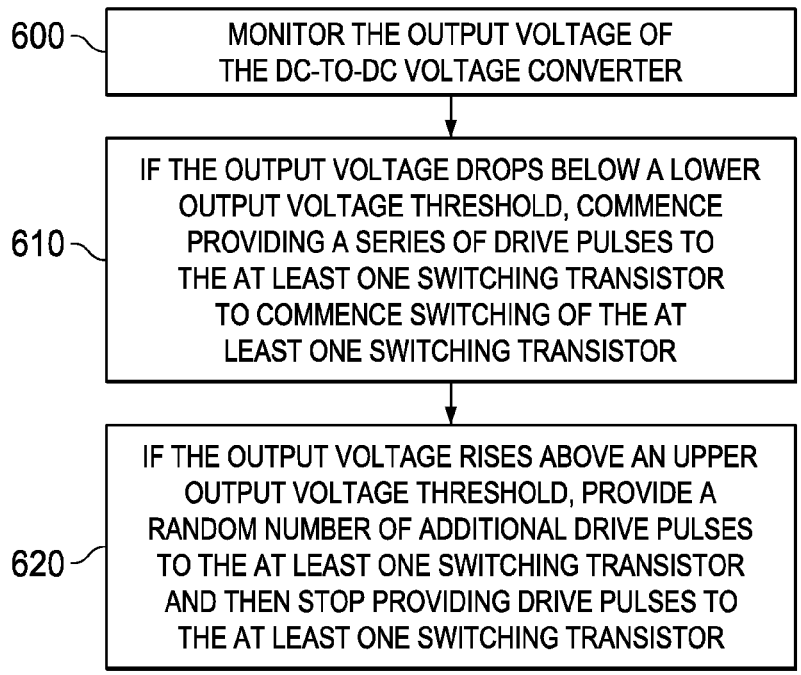
FIG. 6 is a flowchart representing a method of operating a DC-to-DC voltage converter having a power stage that includes at least one switching transistor.

FIG. 6 is a flowchart representing a method of operating a DC-to-DC voltage converter having a power stage that includes at least one switching transistor. At step 600, the output voltage of the DC-to-DC converter is monitored. At step 610, if the output voltage drops below a lower output voltage threshold, a series of drive pulses is provided to the at least one switching transistor to commence switching of the at least one switching transistor. At step 620, if the output voltage rises above an upper output voltage threshold, a random number of additional drive pulses is provided to the at least one switching transistor and then the providing of drive pulses to the at least one switching transistor is ceased.

While some examples of modulating the PFM frequency of a DC-to-DC voltage converter operating in pulse-frequency modulation mode have been described in detail herein, it is to be understood that the inventive concepts may be otherwise variously embodied and employed and that the appended claims are intended to be construed to include such variations except insofar as limited by the prior art. For example, while aspects of the disclosure are described herein with respect to a buck converter, aspects of the disclosure can also be implemented with regards to other types of converters, including other kinds of DC-to-DC converters, including, but not limited to, boost converters, buck-boost converters, and sepic converters, as well as to charge pump circuits and other circuits that incorporate switching transistors.

What is claimed is:

1. A method of operating an electrical circuit comprising a DC-DC voltage converter having at least one switching transistor, the method comprising:
   providing drive pulses to the at least one switching transistor to cause switching of the at least one switching transistor;
   monitoring a parameter of the electrical circuit;
   comparing the parameter to a threshold value; and
   if the parameter reaches the threshold value, providing a random number of additional drive pulses to the at least one switching transistor and then ceasing the providing of drive pulses to the at least one switching transistor, wherein the parameter comprises an output voltage of the DC-to-DC voltage converter, wherein if the output voltage rises above an upper output voltage threshold, the random number of additional drive pulses are provided to the at least one switching transistor and then the providing of drive pulses to the at least one switching transistor is ceased.

2. The method of claim 1, further comprising:
   if the output voltage drops below a lower output voltage threshold, commencing providing a series of drive pulses to the at least one switching transistor to commence switching of the at least one switching transistor.

3. The method of claim 1 wherein said DC-to-DC voltage converter further comprises an output stage comprising:
   an inductor coupled between the at least one switching transistor and an output node and configured to receive current from the at least one switching transistor in response to the drive pulses provided to the at least one switching transistor; and
   an output capacitor coupled between the output node and a ground.

4. The method of claim 3 wherein said providing a series of drive pulses to the at least one switching transistor to commence switching of the at least one switching transistor results in a pulsed inductor current through the inductor.

5. The method of claim 4 wherein said pulsed inductor current charges the output capacitor, thereby increasing the output voltage at the output node.

6. The method of claim 1 wherein said providing direct the random number of additional drive pulses to the at least one switching transistor after the output voltage rises above an upper output voltage threshold causes a peak output voltage to be modulated randomly.

7. The method of claim 1 wherein said DC-to-DC voltage converter is capable of operating in a pulse frequency modulation (PFM) mode and wherein said providing the random number of additional drive pulses to the at least one switching transistor after the output voltage rises above an upper output voltage threshold causes the PFM frequency to be modulated randomly.

8. A DC-to-DC voltage converter comprising:
   a power stage comprising:
      a voltage input;
      a switching transistor comprising first, second and third terminals, wherein a voltage level at said first terminal controls in part a current flow from said second terminal to said third terminal, said second terminal being coupled to said voltage input; and
      a control circuit operable to provide switching control signals to the first terminal of said switching transistor; and
   an output stage comprising
      an inductor coupled between the third terminal of said switching transistor and a voltage output; and
      an output capacitor coupled between said voltage output and ground;
      wherein said control circuit is operable to monitor an output voltage at the voltage output and to:
      in response to the output voltage dropping below a lower output voltage threshold, commence providing a series of drive pulses to the first terminal of said switching transistor; and
      in response to the output voltage rising above an upper output voltage threshold, provide a random number of additional drive pulses to the first terminal of said switching transistor and then cease providing drive pulses to the first terminal of said switching transistor.

9. The DC-to-DC voltage converter of claim 8 further comprising a second switching transistor comprising first, second and third terminals, wherein a voltage level at said first terminal controls in part a current flow from said second terminal to said third terminal, said second terminal being coupled to ground and said third terminal being coupled to the third terminal of the first switching transistor.

10. The DC-to-DC voltage converter of claim 8 wherein the control circuit comprises a comparator with hysteresis, said comparator being operable to determine when the output voltage drops below the lower output voltage threshold and when the output voltage rises above the upper output voltage threshold.

11. The DC-to-DC voltage converter of claim 8 wherein said providing the random number of additional drive pulses to the first terminal of said switching transistor after the output voltage rises above the upper output voltage threshold causes a peak output voltage to be modulated randomly.

12. The DC-to-DC voltage converter of claim 8 wherein said control circuit is operable to drive the switching transistor in a pulse frequency modulation (PFM) mode and wherein said providing the random number of additional drive pulses to the first terminal of said switching transistor after the output voltage rises above the upper output voltage threshold causes the PFM frequency to be modulated randomly.

13. A controller for a DC-to-DC voltage converter, said controller comprising:
   a comparator with hysteresis, said comparator being configured to receive an output voltage of the DC-to-DC converter and to determine when said output voltage drops below a lower output voltage threshold and when the output voltage rises above an upper output voltage threshold; and
   control circuitry operable to commence generating a series of drive pulses in response to the output voltage dropping below the lower output voltage threshold, and operable, in response to the output voltage rising above the upper output voltage threshold, to generate a random number of additional drive pulses and then cease generating drive pulses.

14. The controller of claim 13 wherein the DC-to-DC converter comprises a power-stage transistor comprising first, second and third terminals, wherein a voltage level at said first terminal controls in part a current flow from said second terminal to said third terminal, and wherein the control circuitry is operable to provide the generated drive pulses to the first terminal of said power-stage transistor.

15. The controller of claim 14 wherein said providing the random number of additional drive pulses to the power-stage transistor after the output voltage rises above the upper output voltage threshold causes the peak output voltage of the DC-to-DC converter to be modulated randomly.

16. The controller of claim 14 wherein said control circuitry is operable to drive the power-stage transistor in a pulse frequency modulation (PFM) mode and wherein said providing the random number of additional drive pulses to the first terminal of said power-stage transistor after the output voltage rises above the upper output voltage threshold causes the PFM frequency to be modulated randomly.

17. The controller of claim 13 wherein said control circuitry comprises:
   a gate driver circuit operable to commence generating a series of drive pulses in response to the output voltage dropping below the lower output voltage threshold;
   a random number generator operable to generate a random number; and
   a counter operable, in response to the output voltage rising above the upper output voltage threshold, to count a number of drive pulses generated by the gate driver circuit, and operable to provide an indication to the gate driver circuit when the number of counted drive pulses reaches said random number.

18. The controller of claim 17 wherein the DC-to-DC converter comprises a power-stage field-effect transistor, and wherein the gate driver circuit is operable to provide the generated drive pulses to the gate of said power-stage field-effect transistor.

* * * * *